United States Patent [19]

Konstantin

[11] 4,318,685

[45] Mar. 9, 1982

[54] INSERT BANDER

[76] Inventor: Anatole E. Konstantin, 10 Live Oak Rd., Norwalk, Conn. 06851

[21] Appl. No.: 222,711

[22] Filed: Jan. 5, 1981

[51] Int. Cl.[3] .............................................. B29C 27/30

[52] U.S. Cl. .................................... 425/508; 264/230; 425/400; 425/504; 425/515

[58] Field of Search ............... 425/504, 508, 515, 400; 264/230

[56] References Cited

U.S. PATENT DOCUMENTS 4,018,640 4/1977 Amberg .......................... 264/230 X

*Primary Examiner*—Thomas P. Pavelko

[57] ABSTRACT

Apparatus for removably attaching inserts to articles by means of shrinkable plastic bands, comprising in combination:

(1) means for feeding an opened band of shrinkable plastic film into vertical alignment with an article banding station, (2) means for (a) shaping an insert into generally cylindrical form, such that the diameter of said cylindrical shaped insert is less than the diameter of said opened plastic band, but greater than the article over which the insert is to be placed, and (b) feeding said cylindrical shaped insert into vertical alignment with said opened band at said article banding station, said means comprising: (i) a movable plate provided with at least one cylindrical aperture extending through said plate, said aperture communicating on its peripheral side with a slot extending to the edge of said plate and (ii) means for feeding said insert into said aperture and for conforming said insert to the cylindrical inner surface of said aperture, (3) means for telescopingly pushing said opened band and said cylindrically shaped insert over said article so that the band surrounds the insert, and (4) means for heat shrinking said band to conform to the shape of the article.

3 Claims, 9 Drawing Figures

FIG. 7
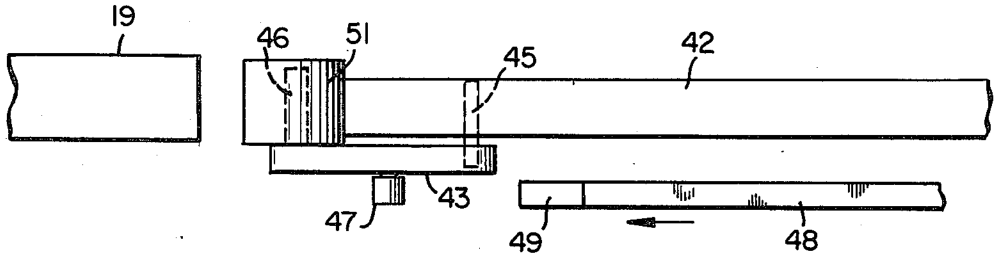
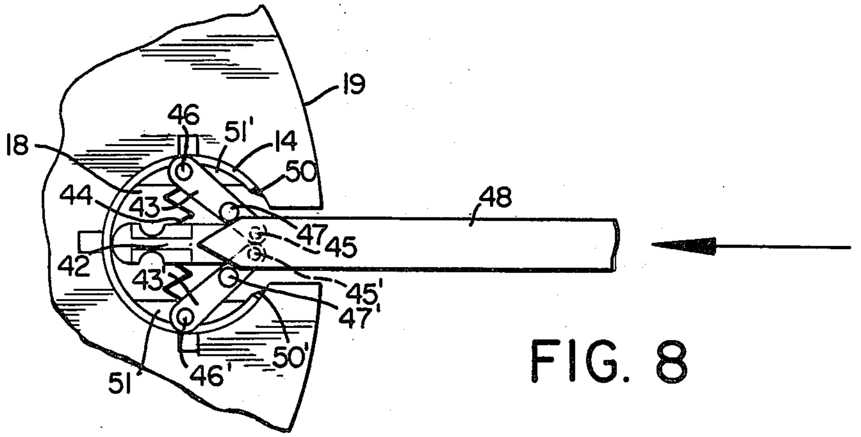
FIG. 8
FIG. 9
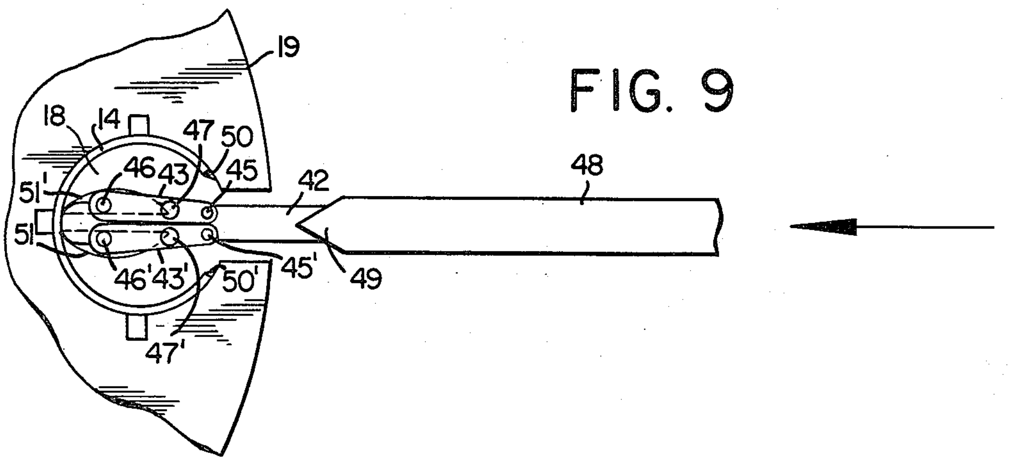

INSERT BANDER

BACKGROUND

This invention relates to apparatus for attaching inserts to articles by means of shrinkable plastic bands that surround both the insert and the article so as to hold the insert tightly in place after the band is shrunk around the article.

A variety of inserts, such as labels and instructions, generally made of paper or plastic, require rapid and simple attachment to bottles jars and other articles. An efficient way of attaching them is by surrounding both the insert and the article with a transparent plastic band or tube which is shrink-fit to conform tightly around the container, thereby firmly attaching the insert to the container. An advantage of this method over gluing on labels is the ease with which the labels may be removed, simply by breaking the plastic band. An advantage of this method of attaching instructions to bottles, for example, is the lower cost resulting from avoiding the need to place both the bottle and the instructions in a box.

OBJECTS

It is an object of this invention to provide apparatus capable of rapidly attaching inserts to articles by means of shrinkable plastic bands.

It is another object of this invention to provide apparatus capable of handling a stack of flat inserts by shaping them into cylindrical form prior to being placed telescopically over and attached to articles by means of shrinkable plastic bands.

SUMMARY OF THE INVENTION

The above and other objects, which will be apparent to those skilled in the art, are achieved by the present invention which comprises:

apparatus for removably attaching inserts to articles by means of shrinkable plastic bands, comprising in combination:

(1) means for feeding an opened band of shrinkable plastic film into vertical alignment with an article banding station, (2) means for (a) shaping an insert into generally clindrical form, such that the diameter of said cylindrically shaped insert is less than the diameter of said opened plastic band, but larger than the portion of said article over which the insert is to be placed, and (b) feeding said cylindrically shaped insert into vertical alignment with said opened band at said article banding station, said means comprising: (i) a movable plate provided with at least one cylindrical aperture extending through said plate, said aperture communicating on its peripheral side with a slot extending to the edge of said plate and (ii) means for feeding said insert into said aperture and for conforming said insert to the cylindrical inner surface of said aperture, and (3) means for telescopingly pushing said opened band and said cylindrically shaped insert over said portion of the article so that the band surrounds the insert.

THE DRAWINGS

FIG. 7 is a side view illustrating the structure with the insert shaping mechanism in accordance with the present invention, wherein the pusher rod is retracted.

FIG. 8 is a bottom view of the shaping mechanism shown in FIG. 7, with the wedge extended to separate the insert spreader.

FIG. 9 is a bottom view of the shaping mechanism shown in FIG. 8 with the wedge retracted and the insert spreader closed.

DETAILED DESCRIPTION

Figure 1:
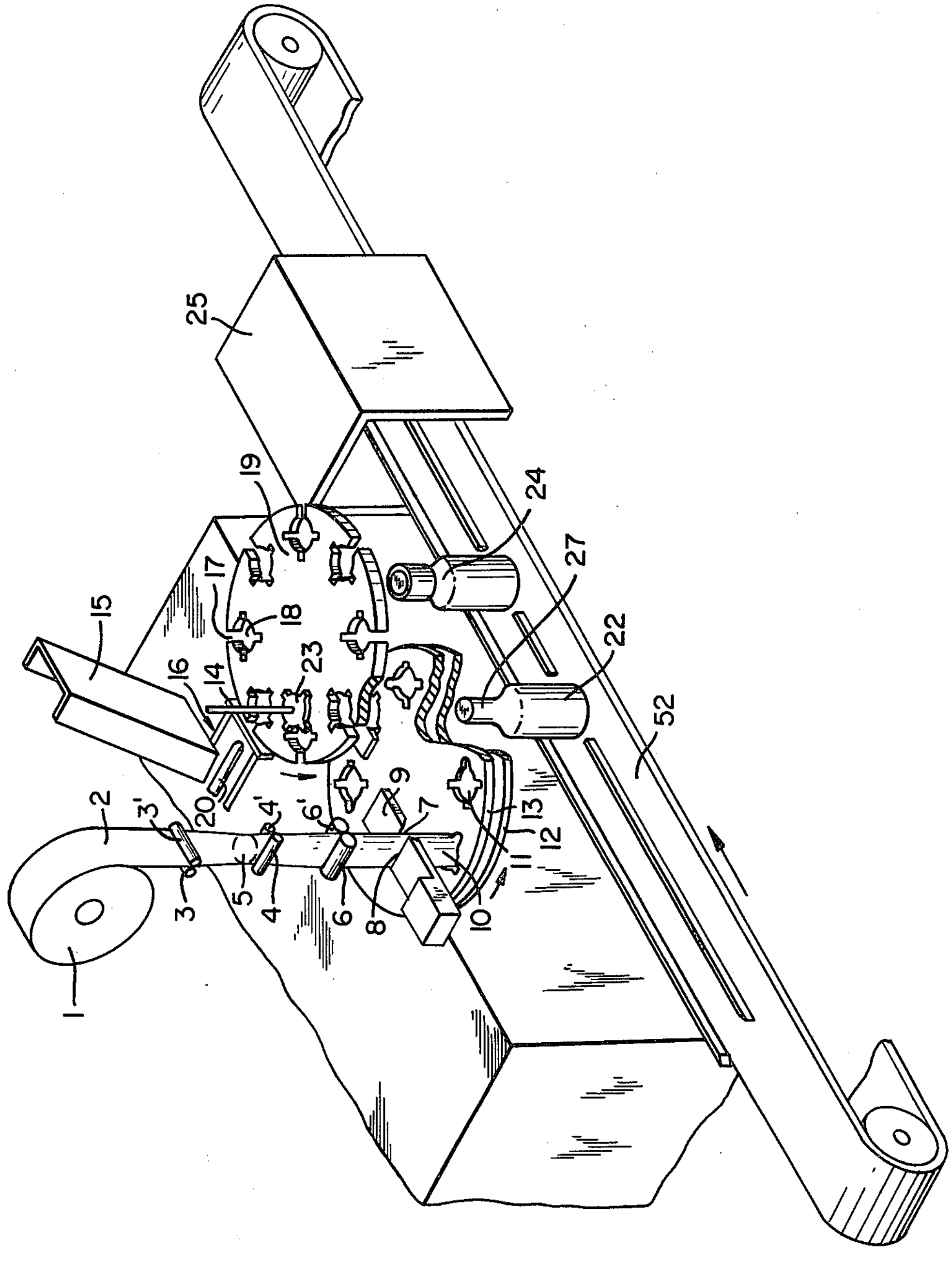
FIG. 1 is a perspective view, partially cut away, illustrating a preferred embodiment of the present invention.

Reference is made to FIG. 1 which illustrates a preferred embodiment of the present invention. The apparatus comprises several cooperating component mechanisms: (A) an assembly for cutting bands of shrinkable plastic film from coiled tubing and for feeding the cut bands into alignment with a banding station, (B) an assembly for picking up inserts from a stack, shaping each insert into cylindrical form and feeding each insert into alignment with the banding station, (C) a conveyor for feeding the articles to be banded into alignment with the banding station, (D) a banding station which includes a plunger that telescopically pushes the aligned band and cylindrically shaped insert over the article and (E) a heater which shrinks the bands tightly around the articles as they are moved through it by the conveyor.

Throughout the specification, drive means are not described in detail, nor shown in the drawings since the means for driving the various driven members are conventional and known to those skilled in the art.

The assembly for cutting and feeding the plastic bands is comprised of a spool 1 of coiled PVC (polyvinylchloride) or other appropriate plastic tubing 2 which is threaded through a pair of guide rollers 3 and 3' and a tube opener consisting of a pair of parallel guide rollers 4 and 4' mounted so that the space between the rollers lies in a plane perpendicular to the plane in which the originally flattened tube 2 lies. A ball 5, placed inside tubing 2, rests on rollers 4 and 4'. Tubing 2 is reflattened by rollers 4 and 4' to lie in the plane perpendicular to its original plane. Tubing 2 is next threaded through driven rollers 6 and 6' which feed tubing 2 through cutting slit 7 that is comprised of driven knife-edge blade 8 and stationery mating blade 9. Tubing 2 is severed by blades 8 and 9 into bands 10 which spring open in slot 11 and rest on plate 12. Rotation of plate 13 in the direction of the arrow causes the bands 10 to be moved into alignment with the cylindrically shaped insert at the banding station. For a more detailed description of apparatus for cutting such plastic bands from tubing, and for placing the bands of shrinkable plastic film over articles, reference is made to my U.S. Pat. No. 3,924,387, the entire disclosure of which is incorporated herein by reference.

A supply of flat inserts 14 is shown stacked in tray 15. A swing arm assembly 16 (shown in more detail in FIGS. 4 through 9) is capable of picking up a single insert 14 from the base of tray 15 by means of suction cups 21 and 21'. Arm assembly 16 is then caused to swing down into alignment with slot 17 which communicates with aperture 18 in rotating plate 19. Extendable rod 20 pushes insert 14 into aperture 18 wherein the insert is opened up and formed into cylindrical shape, as subsequently explained in detail with reference to FIGS. 4 through 9. Plate 19 then rotates the cylindrical insert, in the direction indicated by the arrow, into alignment with the opened band at the banding station.

A movable belt or other suitable conveyor 52 feeds bottles 22 (or whatever article is sought to be banded) into alignment with the band and the insert at the banding station where plunger 23 pushes the cylindrical insert 14 out of aperture 18 and down inside of open band 10 held loosely in aperture 11. Plunger 23 then pushes both insert 14 and band 10 over the neck 27 of bottle 22 where insert 14 surrounded by band 10 come to rest on the shoulder 24 of bottle 22. Thereafter, conveyor 52 moves the banded insert-containing bottle into tunnel dryer 25 where heat causes the band to shrink tightly around the neck 27 of the bottle, thereby securely fastening the insert to the bottle. The insert may be removed readily by breaking the band which adheres neither to the insert nor to the bottle. Motive means for the belt conveyor 52, rotating plates 13 and 19 as well as the swing arm assembly 16 are all conventional electric motor drives suitably geared for sinchronized timing by conventional means well known to those skilled in the art.

Figure 2:
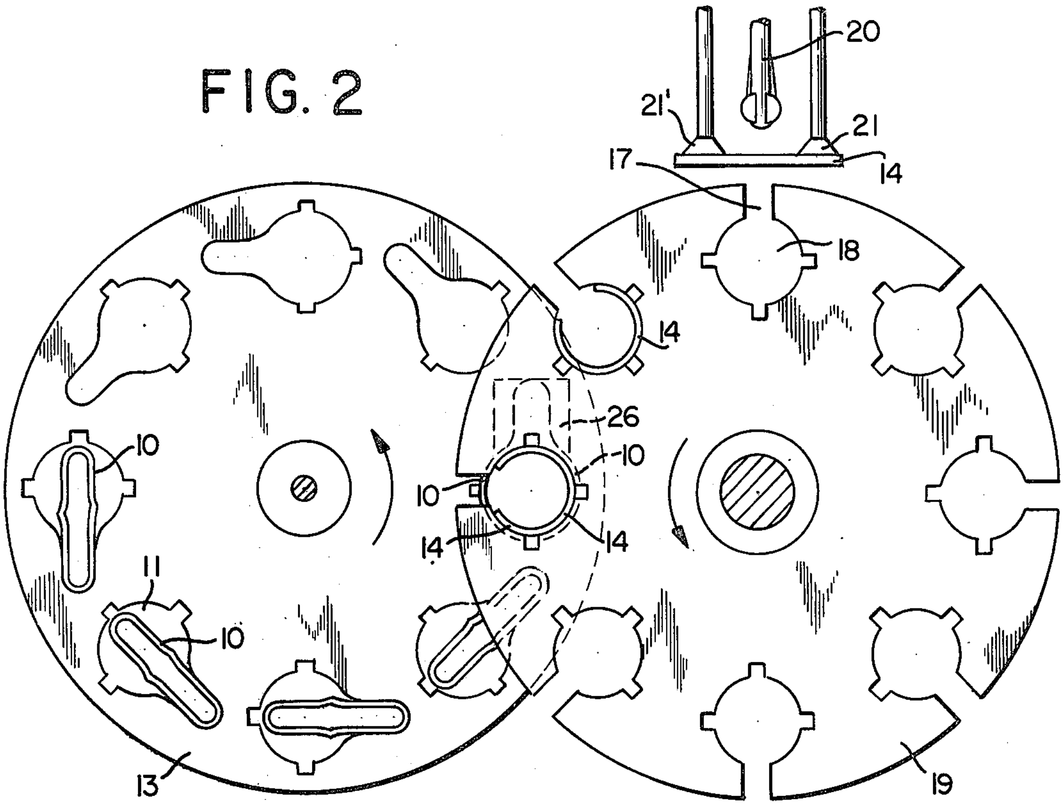
FIG. 2 is an enlarged, top view of the portion of FIG. 1 showing the rotating plates which position the plastic bands and the cylindrically shaped inserts at the banding station.
Figure 3:
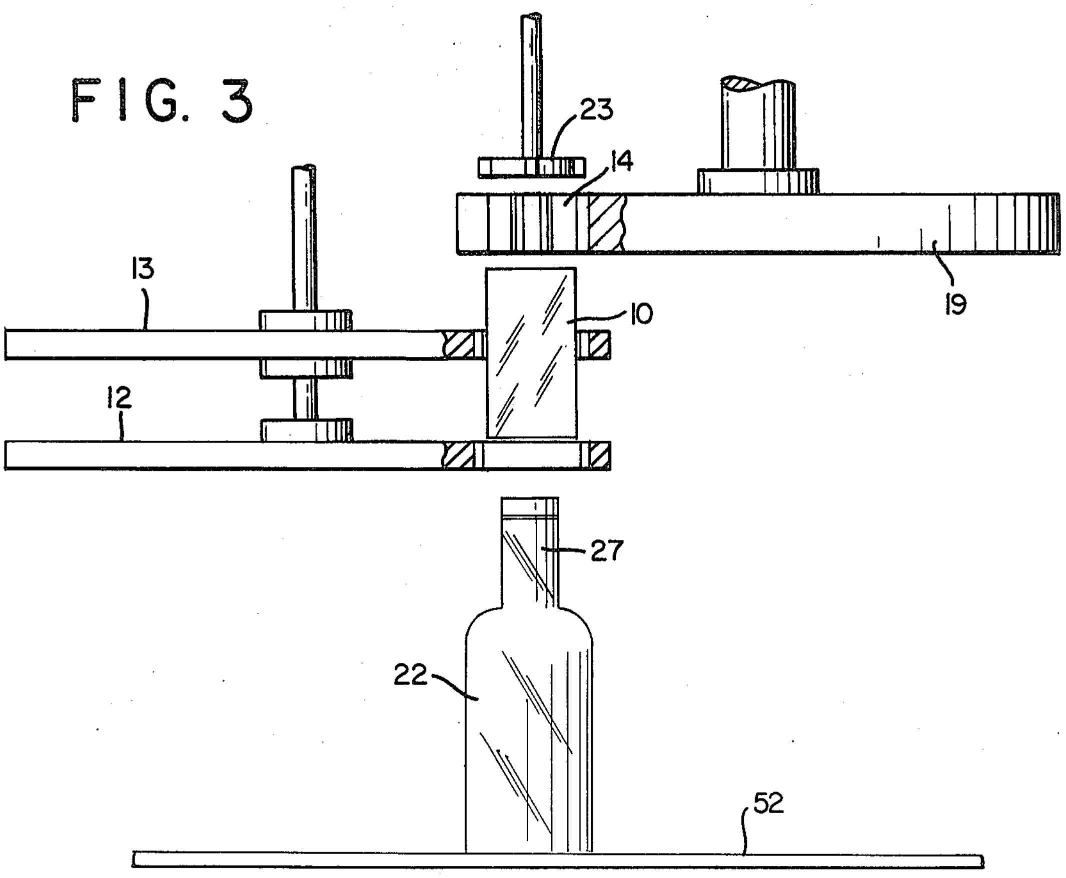
FIG. 3 is a front view of the rotating plates and the banding station shown in FIG. 2.

FIGS. 2 and 3 are enlarged top and front views of the rotating plates and banding station shown in FIG. 1. In these figures it can more easily be seen that the cut plastic bands 10 inside of apertures 11 are rotated by plate 13 until they reach the banding station whereupon band 10 is forced into a cylindrical configuration by being pushed against block 26 located at the banding station between plates 12 and 13. Simultaneously, cylindrical insert 14 is rotated by plate 19 into alignment with band 10 at the banding station where plunger 23 pushes down first on cylindrical insert 14 which fits inside of band 10 since its diameter is smaller than band 10. Plunger 23 continues down, forcing band 10 down also until band 10 with insert 14 inside of it come to rest over the neck 27 of bottle 22. Plunger 23 is then retracted above plate 19 and the cycle is repeated by having the next set of apertures from plates 13 and 19 containing a band and an insert respectively aligned over the next bottle.

Figure 4:
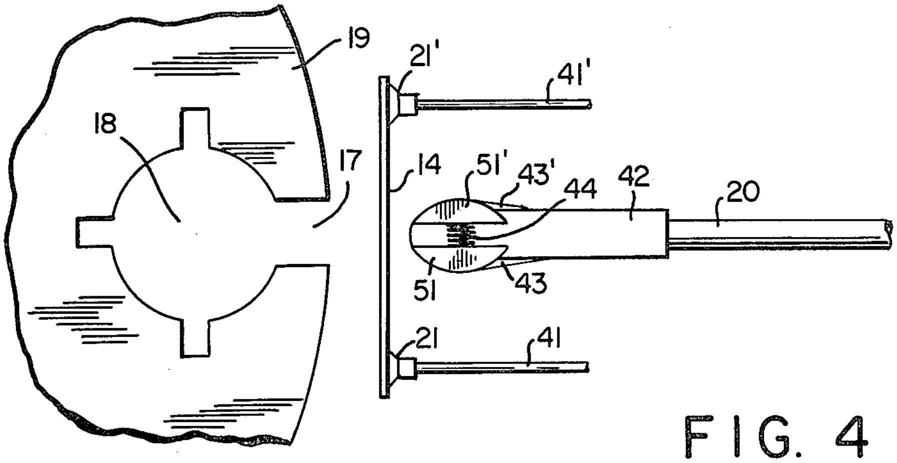
FIG. 4 is a top view illustrating the structure of the insert shaping mechanism of the present invention before the flat insert is shaped into cylindrical form.
Figure 5:
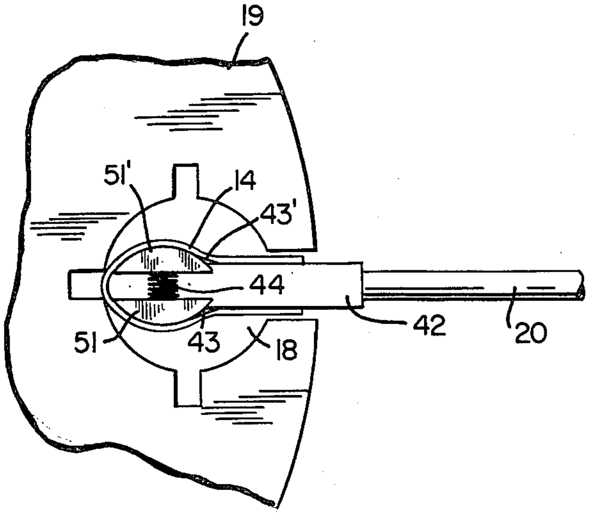
FIG. 5 is a top view of the insert shaping mechanism shown in FIG. 4, but with the insert and pusher rod extended into the forming aperture.
Figure 6:
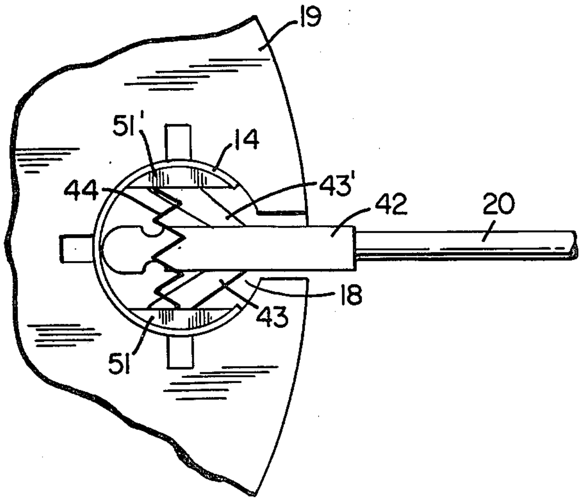
FIG. 6 is a top view of the insert shaping mechanism shown in FIG. 5, but with the insert opened and shaped to conform to the cylindrical inner surface of the aperture by the extended spreader pins.

The manner in which the flat insert 14 is shaped into a cylindrical configuration is shown in FIGS. 4 through 9. FIG. 4 shows a portion of plate 19 as it is aligned with swing arm assembly 16 comprised of swing arms 41 and 41' which are provided with suction cups 21 and 21'. Suction is applied to these cups through holes (not shown) drilled down the center of arms 41 and 41'. The suction cups hold insert 14 in front of slot 17 which communicates with circular aperture 18 in plate 19. Insert 14 is pushed into aperture 18 by the extension of rod 20. The forward end of rod 20 is provided with a round-headed member 42 to which there are hingedly attached spreader arms 43 and 43' held together by spring 44. When rod 20 is extended as shown in FIG. 5, it pushes insert 14 into aperture 18 whereupon the spreader arms 43 and 43' provided with spreader pins 46 and 46' to which shoes 51 and 51' are hingedly attached are opened thereby forcing insert 14 against the cylindrical inner wall of aperture 18 causing the insert to assume a cylindrical shape as shown in FIG. 6.

FIGS. 7, 8 and 9 are side and bottom views illustrating the manner in which the structure operates to open the spreader arms 43 and 43'. As shown in FIG. 7, spreader arm 43 is attached to member 42 by a hinge pin 45. The forward end of arm 43 is provided with a pin 46 to which shoe 51 is hingedly attached. Arm 43 is also provided with a rotatable bearing pin 47. Spreader arms 43 and 43' are opened by the forward extension (in the direction of the arrow) of rod 48 which is provided with a wedge-shaped forward end 49. As the wedge 49 engages roller pins 47 and 47', as shown in FIG. 8, it causes arms 43 and 43' to open, which in turn causes pins 46 and 46' and shoes 51 and 51' to spread insert 14 open against the inner wall of aperture 18. When the wedge 49 is withdrawn, spring 44 causes arms 43 and 43' to be retracted into a closed position, as shown in FIG. 9, for withdrawal of the opening mechanism from the aperture, with insert 14 remaining therein in a cylindrical configuration. The resiliency of the insert itself keeps it from collapsing and firmly in place within the aperture. A shoulder 50 and 50' help to keep the insert from sliding out of the aperture. After withdrawal of the opening mechanism, the cycle is ready to be repeated.

The flat inserts need not, of course, be made of a single sheet of paper or plastic, but may be composed of one or more folded sheets of material.

What is claimed is:

1. Apparatus for removably attaching inserts to articles by means of shrinkable plastic bands, comprising in combination:

(1) means for feeding an opened band of shrinkable plastic film into vertical alignment with an article banding station, (2) means for (a) shaping an insert into a generally cylindrical form, such that the diameter of said cylindrically shaped insert is less than the diameter of said opened plastic band but larger than the portion of said article over which the insert is to be placed, and (b) feeding said cylindrically shaped insert into vertical alignment with said opened band at said article banding station, said means comprising: (i) a movable plate provided with at least one cylindrical aperture extending through said plate, said aperture communicating on its peripheral side with a slot extending to the edge of said plate and (b) means for feeding said inserts into said aperture through said slot and for conforming said insert to the cylindrical inner surface of said aperture, and (3) means for pushing said opened band and said cylindrically shaped insert over said portion of said article in such manner that the band surrounds the insert.

2. The apparatus of claim 1 including means for conveying said articles to said banding station and for conveying said insert banded articles to means for heat shrinking said band to conform to the shape of said articles.

3. The apparatus of claim 1 wherein said means for forming and feeding said cylindrically shaped inserts comprises: (a) suction means for picking up an insert from a source of supply, (b) means for aligning said picked up insert with said slot at the edge of said plate, (c) means for pushing said insert into said aperture through said slot, and (d) means for conforming the shape of said insert to the inside surface of said aperture so as to cause said insert to become cylindrically shaped.

* * * * *